United States Patent [19]

Zevin et al.

[11] Patent Number: 4,989,110
[45] Date of Patent: Jan. 29, 1991

[54] FULL RADIUS CARRIER TO DRUM CONTACT IN A ROTARY HEAD SCANNER

[75] Inventors: Thomas M. Zevin, Van Nuys; Roy A. Utley, La Crescenta, both of Calif.

[73] Assignee: Datatape Incorporated, Pasadena, Calif.

[21] Appl. No.: 317,364

[22] Filed: Mar. 1, 1989

[51] Int. Cl.⁵ .............................................. G11B 15/60
[52] U.S. Cl. ..................... 360/107; 360/84; 360/130.22
[58] Field of Search ............ 360/130.22, 130.21, 360/130.23, 84, 85, 95, 107

[56] References Cited

U.S. PATENT DOCUMENTS

| | | | |
|---|---|---|---|
| 3,972,074 | 7/1976 | Vogel | 360/130.22 |
| 4,150,017 | 4/1979 | Zahn | 360/130.21 |
| 4,200,895 | 4/1980 | Repp | 360/107 |
| 4,459,626 | 7/1984 | Branger | 360/130.22 |
| 4,649,443 | 3/1987 | Hescher et al. | 360/84 |
| 4,761,696 | 8/1988 | Muller et al. | 360/130.22 X |

Primary Examiner—John H. Wolff
Attorney, Agent, or Firm—William F. Noval

[57] ABSTRACT

The rotary head scanner of a helical scan magnetic tape recording/reproducing apparatus includes a carrier which supports the fixed drum or drums of the scanner by means of full radius contact between the drum and the carrier. A rotary head scanner includes upper and lower stationary drums and a head wheel rotably mounted in a slot between the stationary drums. The head wheel includes one or more magnetic heads mounted on the periphery of the head wheel. The rotating heads record on and reproduce from slant tracks on magnetic tape guided around the scanner in a helical path. The upper and lower drums are supported by a carrier which effects full radius contact over a large circumferential arc. Such contact effects rigid mounting of the drums without distortion, thus, minimizing distortion in magnetic tape as it is guided around the rotary head scanner.

3 Claims, 2 Drawing Sheets

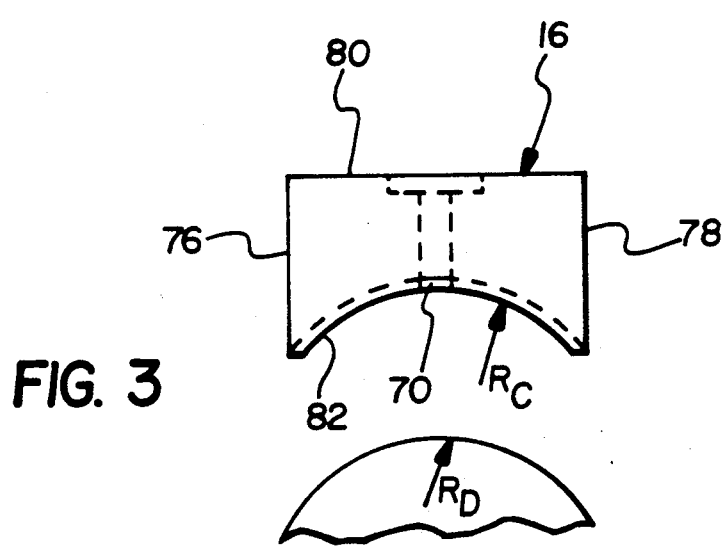
FIG. 3
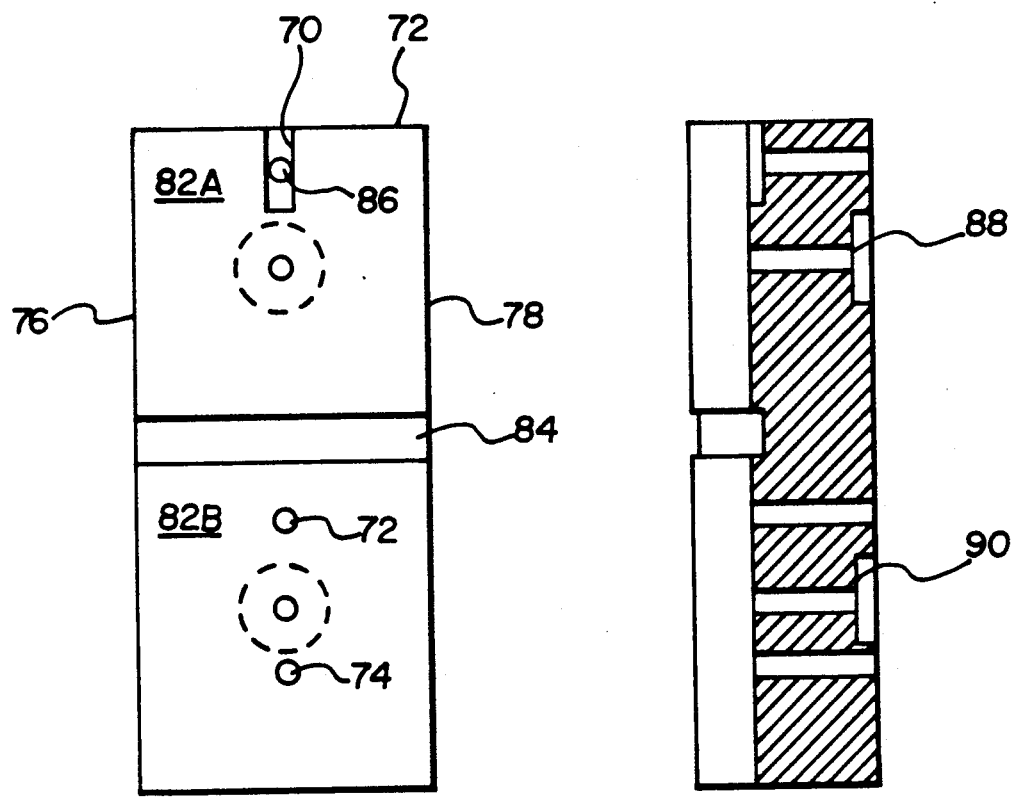
FIG. 4
FIG. 5

FULL RADIUS CARRIER TO DRUM CONTACT IN A ROTARY HEAD SCANNER

BACKGROUND OF THE INVENTION

This invention relates in general to helical scan magnetic tape recording/reproducing apparatus and, in particular, this invention relates to a rotary head scanner assembly in which the stationary drums and a carrier which supports the drums are in full radius contact.

HELICAL SCAN MAGNETIC TAPE

Recording/reproducing apparatus are widely used to record analog or digital information on slant tracks on magnetic tape. The recording/reproducing apparatus includes a rotary head scanner assembly which includes upper and lower stationary drums and a head wheel rotably mounted in a slot between the stationary drums. The head wheel includes one or more magnetic heads mounted on the periphery of the head wheel. Stationary guides, located adjacent to the scanner assembly, guide magnetic tape in a helical path around the drum. The rotating magnetic heads record on or reproduce from slant tracks on the magnetic tape. The wrap angle of the tape about the scanner is usually substantial (for example, 180° or more). In order to insure that the tracks on magnetic tape are at the correct (helical) slant angle and are parallel to each other, the cylindrical drums of the rotary head scanner must be supported in precise axial and surface alignment. Thus, when magnetic tape is guided in a helical path around one drum of the scanner to the other drum of the scanner, the tape should not be stressed or changed in shape so that information recording and reproduction problems are avoided. Such Problems include signal degradation, increased signal noise, reproduction of signals from adJacent tracks, etc.

Several arrangements have been proposed for supporting the cylindrical drums of a rotary head scanner assembly. None of these arrangements have been entirely successful in preventing stress and distortion of magnetic tape as it is guided around the rotary head scanner assembly. Thus, U.S. Pat. No. 4,150,017, issued Apr. 17, 1979, Inventor Zahn, discloses a device for recording and reproducing signals from magnetic:tape. The device includes (1) a support structure having a cavity defined therein; (2) two substantially coaxial guide cylinders disposed in the cavity; and (3) a head wheel supporting recording and reproducing heads disposed between the cylinder. A plurality of circular rods, disposed in the cavity, engage the aligned cylinders along linear contact lines. U.S. Pat. No. 4,200,895, issued Apr. 29, 1980, Inventor Repp, discloses a structure for supporting the two cylindrical halves of a scanning head assembly The structure includes a support block having a surface roughly matching the surface of the cylindrical scanning head assembly and projecting bearing seats formed of cast or molded material in engagement with the cylindrical drums. The bearing seats may be made of cured epoxy cast through holes in the support block. Each cylindrical half is supported by four, spaced, bearing seats.

A further technique for supporting cylindrical halves of a rotary head scanning assembly is disclosed in U.S. Pat. No. 4,649,443, issued Mar. 10, 1987, Inventors Hescher et al. As disclosed in this patent, upper and lower drums of a rotary head scanner are supported by a drum guide by means of pairs of ribs extending above a cylindrical hollow cavity of the drum guide. The rib pairs extend axially of the drums and have arcuate surfaces which contact the upper and lower drums over a small arc angle.

The drum support arrangements of these patents are disadvantageous for several reasons. Since a drum is supported at circumferentially spaced locations with a free span of drum therebetween, when the drum is fastened to the support at a point which is between the supporting locations, the drum may be excessively distorted into an elliptical shape. This produces stress and distortion in magnetic tape guided around the drum and consequent distortion and degradation of signals recorded on and reproduced from the magnetic tape. Similar problems arise if there is longitudinal distortion of a drum and if distortions of the upper and lower drums are unsymmetrical. Moreover, as noted in U.S. Pat. No. 4,649,443, long term shape stability problems of synthetic rosin seating members :an arise.

SUMMARY OF THE INVENTION

According to a feature of the present invention, a rotary head scanner is provided in which stress and distortion of magnetic tape guided in a helical path around the cylindrical surface of the rotary head scanner is minimized. Consequently, signal degradation in recording and reproducing information relative to slant tracks on the guided magnetic tape is minimized. According to another feature of the present invention, the stationary drum or drums of a rotary head scanner assembly are supported by means of a carrier having full radius contact between the drum and carrier to minimize circumferential and radial distortion produced by fastening the drum to the carrier. The carrier has a lapped cylindrical surface which is substantially the same radius as the cylindrical surfaces of the upper and lower drums of a rotary head scanner assembly. The cylindrical drums are supported by the carrier which effects full radius contact over a large circumferential arc. Thus, when the drums are fastened to the carrier, distortion of the cylindrical shape of the drums is minimized. Stress and distortion of magnetic tape guided around the surface of the drums in a helical path is consequently minimized.

BRIEF DESCRIPTION OF THE DRAWINGS

The invention will be described with reference to the accompanying drawings wherein like numbers are used for like elements.

FIGS. 3, 4 and 5 are, respectively, top plan, front elevational, and partially sectional, side elevational views of a preferred embodiment of the present invention.

DETAILED DESCRIPTION OF THE PREFERRED EMBODIMENT

Figure 1:
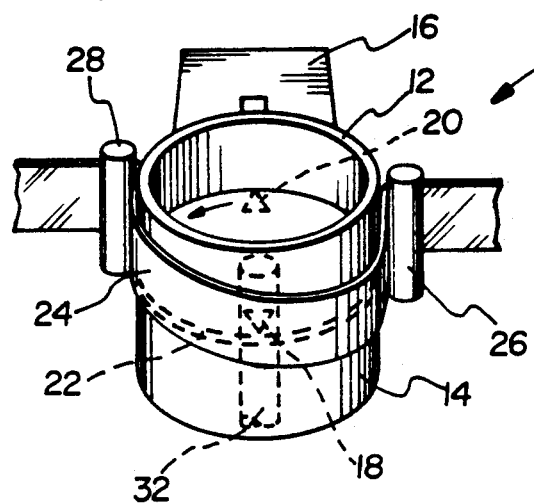
FIG. 1 is a diagrammatic perspective view showing magnetic tape guided around a rotary head scanner.

A preferred embodiment of the present invention will be described below as used in helical s:an magnetic tape recording/reproducing apparatus. In such apparatus, magnetic: tape is transported between supply and take up reels past a rotary head scanner assembly. Such an assembly is shown diagrammatically in FIG. 1. As shown, rotary head scanner assembly 10 includes upper and lower cylindrical drums 12 and 14 supported by carrier 16. Magnetic heads 18 and 20 are mounted for rotation within a slot 22 between drums 12 and 14. Magnetic tape 24 is guided in a helical path around drums 12 and 14 by means of stationary guide posts 26 and 28. Posts 26 and 28 are tilted to establish the angle of wrap (e.g., 180°) of tape 24 about scanner assembly 10. As magnetic tape 24 follows a helical path around drums 12 and 14, magnetic heads 20 and 18 cross the width of the tape at a shallow angle to record and reproduce information in slant tracks on tape 24.

Figure 2:
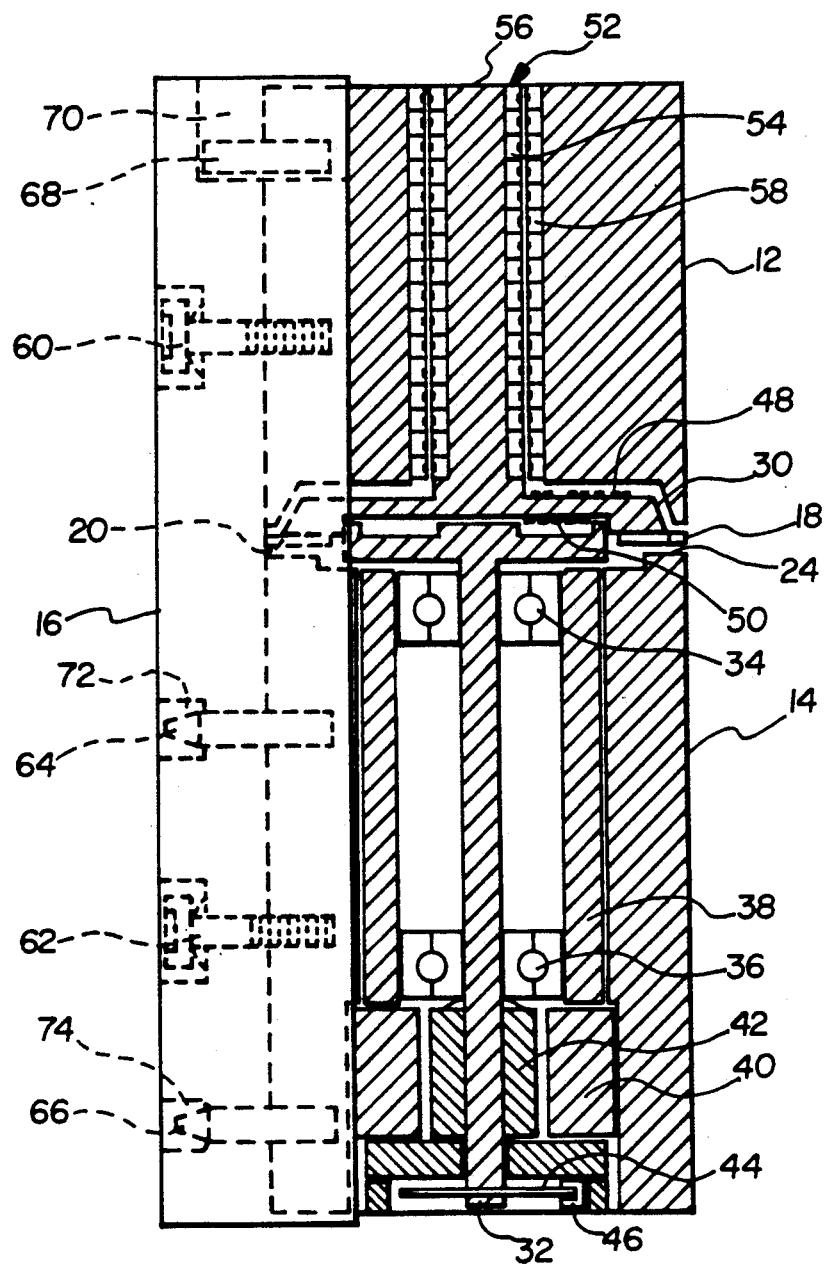
FIG. 2 is a cross sectional, elevational view of a rotary head scanner assembly including an embodiment of the present invention.

Referring now to FIG. 2, there is shown in greater detail rotary head scanner assembly 10. As shown, magnetic heads 18 and 20 are mounted for rotation on head wheel 30. Head wheel 30 is mounted on shaft 32 which is journaled in bearings 34 and 36 of bearing housing 38. Bearing housing 38 is mounted in lower stationary drum 14. Shaft 32 is rotated by means of a motor including stator 40 mounted on lower drum 14 and rotor 42 mounted on shaft 32.

A tachometer disk 44 mounted on shaft 32 is sensed by sensor 46. Sensor 46 provides signals representative of the rotational speed and position of magnetic heads 18 and 20.

Head wheel 30 includes record circuitry 48 and playback circuitry 50 for processing signals supplied to and received from magnetic heads 18 and 20. A plurality of rotary transformers 52, mounted by upper drum 12, transmit signals to and from circuits 48 and 50 on head wheel 30. Transformers 52 include rotary transformer rotors 54 mounted on head wheel extension 56 and rotary transformer stators 58 mounted on drum 12.

Upper and lower drums 12 and 14 are fastened to carrier 16 by means of screws 60 and 62, respectively. Pins 64 and 66 mounted on lower drum 14 and pin 68 mounted on upper drum 12 locate drums 12 and 14 in axial alignment with one another and in rotational alignment with carrier 16. Pins 64 and 66 respectively project into radial slots 72 and 74 in carrier 16, while pin 68 projects into axial slot 70 in carrier 16, to permit accurate alignment of drum 12 with drum 14.

Referring now to FIGS. 3–5, there will be described in greater detail a preferred embodiment of drum carrier according to the present invention. As shown, carrier 16 has top and bottom walls 72 and 74, side walls 76 and 78, back wall 80 and arcuate front wall 82. Wall 82 has upper and lower partially cylindrical segments 82A and 82B for respectively contacting upper and lower drums 12 and 14. An arcuate slot 84 in wall 82 is recessed from wall segments 82A and 82B to provide a path for rotating magnetic heads 18 and 20.

Axial slot 70 is provided in wall segment 82A and radial bores 72, 74 and 86 effect axial and circumferential alignment of drums 12 and 14 relative to carrier 16. Radial bores 88 and 90 respectively receive screws 60 and 62 to fasten drums 12 and 14 to carrier 16.

According to a feature of the present invention, upper and lower drums 12 and 14 are rigidly supported by carrier 16 with minimal distortion to drums 12 and 14 in either the circumferential or axial directions. Full radius contact is effected over a substantial cylindrical section of both drums 12 and 14 and carrier 16. Thus, the radius $R_C$ of the arcuate cylindrical segments 82A and 82B of carrier 16 are lapped to the exact dimensions of the radius $R_D$ of cylindrical drums 12 and 14. When drums 12 and 14 are fastened to carrier 16 by means of screws 60 and 62, axial and circumferential distortion of drums 12 and 14 is minimized. This result is effected by the accurate lapping of the cylindrical surface of wall segments of 82A and 82B to the cylindrical dimensions of drums 12 and 14. Contact between carrier 16 and drums 12 and 14 is thereby effected over a large circumferential angle and over the full length of the drums.

As described above, prior art scanner drum support arrangements have relatively narrow angular contact between the drum support and the drums. This results in an unsupported drum span between the regions of support which causes axial and circumferential distortions when the drums are fastened to the support. The carrier of the present invention, however, effects full radius contact between the drum and carrier over a continuous, large circumferential angle. Thus, there is no substantially unsupported segment of the drums between regions of contact with the carrier, so that, when the drums are fastened to the carrier, distortions in either the axial or circumferential dimensions are minimized. It has been found that, by fastening drums 12 and 14 to carrier 16 by means of fasteners located along the axial center line of the areas of contact between drums 12 and 14 and carrier 16, circumferential distortion of the drums will be minimized even if there is overtightening.

The surfaces of carrier wall segments 82A and 82B are lapped by well known lapping techniques to the cylindrical dimensions of drums 12 and 14. Thus, when magnetic tape 24 is guided around drums 12 and 14 in a helical path, the tape will not be subjected to stress and distortion. Thus, degradation and loss of information recorded on and reproduced from magnetic tape 24 will be minimized. Moreover, the slant tracks of information recorded on tapes 24 by magnetic heads 18 and 20 will be precisely parallel to each other and be at the proper slant (helical) angle.

The invention has been described in detail with reference to the Figures, however, it will be appreciated that variations and modifications are possible within the spirit and scope of the invention.

What is claimed is:

1. In helical scan recording/reproducing apparatus, a rotary head scanner assembly comprising:

an upper cylindrical scanner drum;

a lower cylindrical scanner drum axially spaced from said upper cylindrical scanner drum;

a magnetic transducer means for transducing information relative to magnetic tape guided around said drums in a helical path;

means for mounting said transducer means for rotation between said upper and lower scanner drums; wherein said upper drum, said lower drum, and said mounting means are concentric with each other;

an elongated carrier having a lapped, cylindrical arcuate surface of the same radius as said drums which contacts said upper and lower drums over a single, large continuous region extending over a large, substantially continuous, circumferential angle and extending over substantially the axial length of said drums with no substantially unsupported segment of said drums over said contact regions with said carrier; and means for fastening said drums to said carrier.

2. The rotary head scanner assembly of claim 1 wherein said upper and lower scanner drums have a cylindrical outer dimension with a radius of $R_D$ and wherein said arcuate cylindrical surface of said carrier is lapped to a circumferential radius $R_C$ which is equal to radius $R_D$.

3. The rotary head scanner assembly of claim 1 wherein said fastener means include firs and second screws for respectively fastening said upper and lower drums to said carrier, and wherein said screws are fastened to said drums at central locations of said lapped contacting surfaces.

* * * * *